F. WELLER.
DUMB WAITER SAFETY DEVICE.
APPLICATION FILED JAN. 17, 1918.
1,270,079.
Patented June 18, 1918.
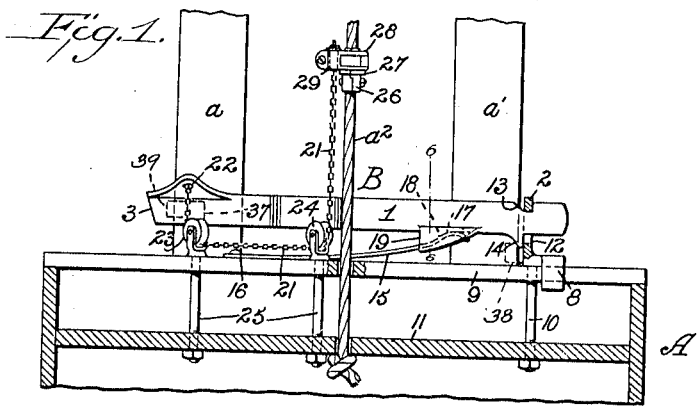
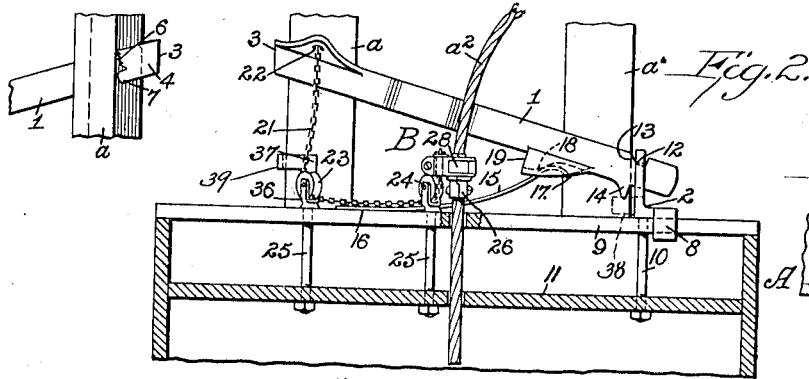
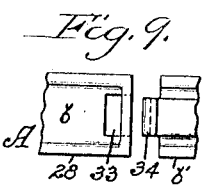
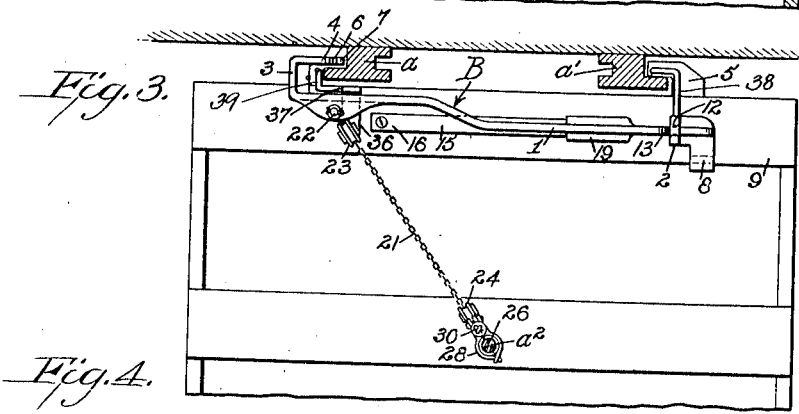
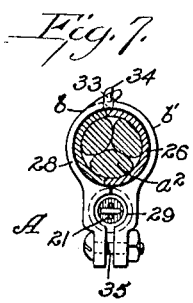
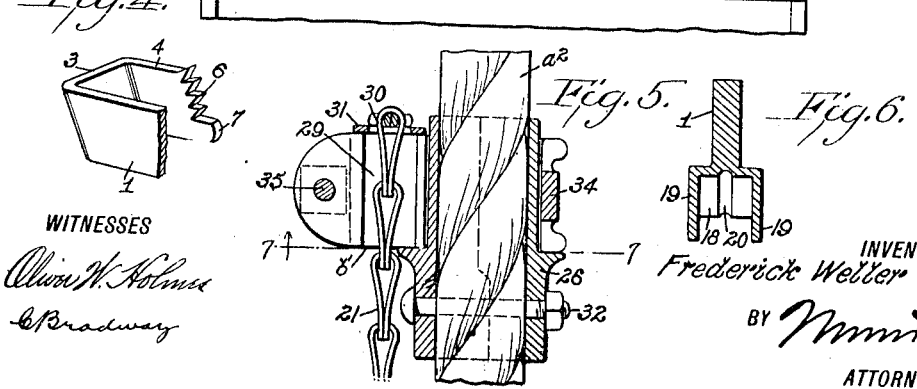
WITNESSES
INVENTOR
Frederick Weller
BY
ATTORNEYS

UNITED STATES PATENT OFFICE.

FREDERICK WELLER, OF NEW YORK, N. Y.

DUMB-WAITER SAFETY DEVICE.

1,270,079.   Specification of Letters Patent.   Patented June 18, 1918.

Application filed January 17, 1918. Serial No. 212,255.

*To all whom it may concern:*

Be it known that I, FREDERICK WELLER, a citizen of the United States, and a resident of the city of New York, borough of the Bronx, in the county of the Bronx and State of New York, have invented a new and Improved Dumb-Waiter Safety Device, of which the following is a full, clear, and exact description.

This invention relates to safety devices especially adapted for dumbwaiters to prevent the dropping of the box in case the suspension cable should break, and the invention relates to that type which includes a dog or clutch element in the form of a lever which is normally held in released position when the suspension cable of the dumbwaiter box is intact or under normal tension, and when the cable breaks or becomes slack, the clutch member is automatically thrown into engagement with one of the guide rails for the dumbwaiter box, to thereby prevent the dropping of the latter.

The invention has for its general objects to improve and simplify the construction and operation of devices of this character so as to be reliable and efficient in use, comparatively simple and inexpensive to manufacture, and so designed that the device can be applied as an attachment to dumbwaiters already in use.

A more specific object of the invention is the provision of a clutch element or lever mounted on the top of the dumbwaiter box and connected by novel means with the suspension cable, whereby the latter when in normal condition holds the clutch element released, the connecting device between the clutch element and suspension cable having means whereby the suspension cable is free to turn or twist without entangling or deranging the said connecting means.

Another object of the invention is to provide a clutch lever having simple and novel connection with the supporting or fulcrum bracket, and also having means whereby the setting spring will exert its proper tension on the clutch lever to hold the same in set or gripping position.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a vertical section of the upper portion of a dumbwaiter box with the parts of the safety device in normal position;

Fig. 2 is a similar view showing the clutch lever in set or holding position;

Fig. 3 is a plan view of Fig. 1;

Fig. 4 is a perspective view of the gripping end of the clutch lever;

Fig. 5 is an enlarged vertical section of the connecting means between the suspension cable and the clutch lever chain;

Fig. 6 is a detail vertical section on the line 6—6, Fig. 1;

Fig. 7 is a horizontal section on the line 7—7, Fig. 5;

Fig. 8 is a detail view showing the clutch lever in holding position; and

Fig. 9 is a detail view showing the parts of the clip separated.

Referring to the drawing, A designates a dumbwaiter box of any suitable construction, and $a$ and $a'$ are two of the guide rails which extend the full length of the dumbwaiter shaft to guide the box.

The safety device B comprises a clutch element or lever 1 which is fulcrumed at one end on a bracket 2 and has its opposite end formed into a hook 3 so disposed that the bill 4 coöperates with the guide rail $a$ to assist in guiding the dumbwaiter box A. The hook, bracket or shoe 5 on the side of the box A engages the guide rail $a'$ to assist in guiding the box A. The edge of the bill 4 is provided with teeth 6 and also with a lug 7 which projects horizontally beyond the teeth. Normally the lever 1 is in approximately horizontal position, as shown in Fig. 1, and the teeth 6 are maintained out of engagement with the rail $a$ by reason of the lug or projection 7, but when the lever is thrown upwardly to an inclined position, as shown in Figs. 2 and 8, the teeth 6 engage the rail $a$ and prevent the box from dropping. The bracket 2 has a horizontal hook 8 which engages one edge of the strip 9 on the top of the box A, and a bolt stem 10 fastened to the base of the bracket passes through the strip 9 and top 11 of the box so that a single bolt coöperating with the hook or lug 8 rigidly holds the bracket 2 in place. The bracket has an upstanding member provided with a rectangular slot 12 into which the end of the lever 1 extends. The top edge of the lever has a recess 13 which engages the top edge of the opening 2 to form a fulcrum on which the lever swings. A depending lug 14 on the lever serves as a stop to prevent the longitudinal displacement of the lever in the bracket. A spring 15, which may be made of a flat strip of metal, or a round bar, has one end 16 fastened to the board 9, and the free end 17 of the spring bears on a cam-shaped projection 18 on the under side of the lever 1. Spaced flanges 19 depend from the sides of this projection and form a recess whereby the free end of the spring cannot become disengaged from the lever.

The projecton 18 is so shaped that the lever when in its uppermost position will be subjected to substantially the same pressure from the spring as when in its lowered position. If the spring is made of wire the projection 18 may have a central channel 20, as shown in Fig. 6, to form a seat into which the free end of the wire will engage.

The lever is normally held in lowered position through the agency of a chain or other flexible element 21 which has one end connected at 22 with the free extremity of the lever 1. The chain passes under two pulleys 23 and 24 located respectively adjacent the free end of the lever and the suspension cable $a^2$ of the dumbwaiter box. The frames of the pulleys are provided with bolts 25 whereby the pulleys are fastened to the box A. The flexible element 21 is connected with the cable $a^2$ in such position that when the cable is taut by supporting the box A, the lever 1 will be held in the position shown in Fig. 1, and when the cable breaks, the flexible element 21 becomes slack, and the spring 15 throws the lever 1 into holding position, as shown in Fig. 2. The connecting means between the cable $a^2$ and the element 21 is of special construction and comprises a sleeve 26 which has an annular shoulder or seat 27 on which rotatably bears a clip 28. This clip 28 has a vertical opening 29 through which the end of the element 21 extends, and a cotter pin 30 passes through the end link of the chain 21 and rests on a washer 31, which bears on the top of the clip 28, as shown in Fig. 5. By this means there is no danger of the chain kinking, and as the clip is freely rotatable on the sleeve 26, the suspension cable is free to twist or turn without deranging the safety device. To enable the sleeve and clip to be readily attached to a cable, the sleeve is made in two parts which are held gripped around the cable by a bolt 32 which passes through the parts of the sleeve and through the cable, as shown in Fig. 5. The clip 28 is made in two parts and the part $b$ has an opening 33 and the part $b'$ has a hook-shaped lug 34 which interlocks in the opening, as shown in Fig. 7. The parts are further secured together by a bolt 35. To assist in holding the free end of the lever in proper position the frame 36 of the pulley 23 has an upwardly extending arm or member 37 which normally prevents lateral movement of the lever if the box should have a tendency to sway, also a lug to act as a guide for box.

The bracket 2 is provided with an L-shaped horizontally extending lug 38, Fig. 3, for engaging the guide rail $a'$, to assist in guiding the movement of the dumbwaiter. The bracket 36 has an L-shaped horizontally extending lug 39 which, by engaging the outer edge of the guide rail $a$, will prevent the lateral play of the dumbwaiter to an extent that the lug 7 on the lever 1 cannot bind on the guide rail $a$ when the lever is down.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a dumbwaiter box, a suspension cable, a stationary rail along which the box moves, a clutch lever mounted on the box and adapted to engage the rail, a flexible element separate from the suspension cable and connected with the lever, a connection between the flexible element and cable for permitting the latter to twist without affecting the flexible element, guides on the box for the flexible element, whereby the cable when under normal tension holds the clutch lever released, and spring means for throwing the clutch lever into engagement with the rail when the cable breaks or its tension slackens, the flexible element extending downwardly from the lever to and under the guides and upwardly from the latter to the said cable.

2. The combination of a dumbwaiter box, a fixed rail along which the box moves, and a safety device including a clutch member movable into and out of engagement with the rail, said member having teeth adapted to grip the rail when the member is in one position, and a projection adjacent the teeth and coöperating with the rail when the member is in normal position to guide the movement of the box and prevent the teeth from gripping the rail.

3. The combination of a dumbwaiter box, a fixed rail along which the box moves, and a safety device including a clutch member movable into and out of engagement with the rail, said member having teeth adapted to grip the rail when the member is in one position, a projection adjacent the teeth and coöperating with the rail when the member is in normal position to guide the movement of the box and prevent the teeth from gripping the rail, a fulcrum means on the box and on which the member swings, and a fixed member on the box adjacent the free end of the lever for preventing lateral movement thereof.

4. The combination of a dumbwaiter box, a fixed rail on which the box moves, a clutch lever fulcrumed on the box and adapted to engage the rail, a suspension cable for the box, connecting means between the cable and lever for holding the latter normally released from the rail, a spring on the box to throw the lever into clutching position, and a slotted bracket on the box and into the slot of which the lever extends, said lever having in its top edge a recess held in engagement with one end of the slot by the spring and a stop lug on the bottom edge of the lever to prevent longitudinal movement thereof in the bracket.

5. The combination of a dumbwaiter box, a suspension cable therefor, a sleeve fixed on the cable and having a bearing shoulder, a clip loosely engaged around the sleeve and bearing on the shoulder, a flexible element having a swiveled connection with the clip, a safety device mounted on the box and connected with the said element, and guide means on the box for the portion of the element intermediate the safety device and said clip.

6. The combination of a dumbwaiter box, a suspension cable therefor, a sleeve fixed on the cable and having a bearing shoulder, a clip loosely engaged around the sleeve and bearing on the shoulder, a flexible element having a swiveled connection with the clip, a safety device mounted on the box and connected with the said element, and guide means on the box for the portion of the element intermediate the safety device and said clip, said sleeve being made of two parts detachably clamped together, and the said clip being detachably connected with the sleeve.

7. The combination of a dumbwaiter box, a suspension cable therefor, a sleeve fixed on the cable and having a bearing shoulder, a clip loosely engaged around the sleeve and bearing on the shoulder, a flexible element having a swiveled connection with the clip, a safety device mounted on the box and connected with the said element, and guide means on the box for the portion of the element intermediate the safety device and said clip, said clip being detachably connected with the sleeve and formed of two parts, one part being provided with a slot and the other a hook engaging the slot, and a fastener coöperating with the hook and slot to secure the parts together.

8. The combination of a dumbwaiter box, guide rails, a safety device mounted on the box and engageable with one of the guide rails, a bracket on which the safety device is mounted, and a member mounted on the bracket and engageable with the other guide rail to assist in guiding the box.

9. The combination of a dumbwaiter box, a guide rail, a safety device mounted on the box and including a lever formed with a hook-shaped end provided with gripping teeth and with a lug, said teeth being adapted to grip the guide rail when the safety device is released, and a member projecting from the box and engaging the guide rail to prevent the said lug of the lever from having a binding engagement with the guide rail when the lever is in normal position.

FREDERICK WELLER.

Copies of this patent may be obtained for five cents each, by addressing the "Commissioner of Patents, Washington, D. C."